United States Patent [19]

Perret

[11] Patent Number: 4,669,570

[45] Date of Patent: Jun. 2, 1987

[54] ANTI-THEFT DEVICE FOR AUTOMOTIVE VEHICLES ACTING ON THE HYDRAULIC BRAKING CIRCUIT

[76] Inventor: Maurice Perret, 11 rue de La Resistance, 31120 Pinsaguel, France

[21] Appl. No.: 738,387

[22] Filed: May 28, 1985

[30] Foreign Application Priority Data

Jun. 1, 1984 [FR] France .................. 84 08742

[51] Int. Cl.⁴ ........................................... B60K 27/00
[52] U.S. Cl. .................................................. 180/287
[58] Field of Search ............................ 180/287, 271

[56] References Cited

U.S. PATENT DOCUMENTS

| 2,601,909 | 7/1952 | Seppmann | 188/152 |
| 3,470,974 | 10/1969 | Pefine | 180/287 |
| 3,653,730 | 4/1972 | Cvetkovich | 303/89 |
| 3,656,574 | 4/1972 | Edwards | 303/89 |
| 3,735,834 | 5/1973 | St. Onge | 303/89 |
| 3,800,279 | 3/1974 | Thompson | 340/65 |
| 3,871,475 | 3/1975 | Stevenson et al. | 292/144 |
| 4,205,300 | 5/1980 | Ho et al. | 180/287 |
| 4,258,819 | 3/1981 | Baptiste, Sr. | 180/287 |

FOREIGN PATENT DOCUMENTS

| 945472 | 5/1949 | France . |
| 994268 | 11/1951 | France . |
| 1136600 | 5/1957 | France . |
| 2024351 | 1/1980 | United Kingdom . |

Primary Examiner—John J. Love
Assistant Examiner—Ross Weaver
Attorney, Agent, or Firm—Young & Thompson

[57] ABSTRACT

The present invention concerns an anti-theft device for automotive vehicles acting on the braking circuit to lock the wheels. The device according to the invention acts on the hydraulic braking circuit of a vehicle, the circuit comprising a generator of hydraulic energy (1) or master cylinder connected by the intermediary of hydraulic conduits to hydraulic energy receiving mechanisms or brake (2), the device being characterized essentially by a second generator of hydraulic energy (3) connected to the hydraulic braking circuit below the first generator (1) and by a hydraulic circuit selector means (4) which switches the receiving mechanisms (2) either only with the first energy generator (1), or only with the second (3), this latter taking place when a surveillance circuit detects information indicative of an unauthorized use of the vehicle, which surveillance circuit in this case acts on the second generator (3) such that this latter pressurizes the brakes of the vehicle.

16 Claims, 6 Drawing Figures

ANTI-THEFT DEVICE FOR AUTOMOTIVE VEHICLES ACTING ON THE HYDRAULIC BRAKING CIRCUIT

The present invention has for an object an anti-theft device for automotive vehicles which acts on the braking circuit to permit the locking of the wheels and to avoid any displacements.

The known anti-theft devices comprise particularly a valve having two distinct positions and connected on the hydraulic circuit between the master cylinder and the brake cylinders.

According to the first position, the valve allows the free circulation of the hydraulic fluid between the master cylinder and the brakes and conversely when according to the second position, the hydraulic circuit is interrupted and the hydraulic fluid cannot circulate from the brake cylinders toward the master cylinder.

Thus, the hydraulic fluid between the valve and the brake cylinders may remain under pressure, thus maintaining the actuated brakes.

Generally associated with such valves are electromagnets which assure the switching from one position to the other, and an electronic apparatus for the energization of the electromagnets.

This electronic apparatus from a code which it identifies assures the switching of the valve from the first position toward the second so as to free the braking circuit.

The major inconvenience of such anti-theft devices resides in the fact that the part of the braking circuit comprised between the brake cylinders and the valve must remain constantly under pressure to prohibit the unauthorized use of the vehicle. Thus the part of the braking circuit comprised between the valve and the brakes may remain under pressure several days.

From this inconvenience, there results an excessive strain on the braking circuit.

The present invention has for an object to overcome the above-described inconvenience by providing an anti-theft device for vehicles which locks the wheels by action on the braking circuit when the unauthorized usage is detected.

To this effect, the anti-theft device according to the invention is of the type which acts on the braking circuit of a vehicle to immobilize the wheels, this hydraulic braking circuit comprising a generator of hydraulic energy 1 where the master cylinder connected by the intermediary of hydraulic conduits to hydraulic energy receiving mechanisms or brakes is characterized essentially by a second hydraulic energy generator and by a hydraulic circuit selection means which switches the receiving mechanisms either only with the first hydraulic energy generator, or only with the second hydraulic energy generator, this latter switching being assured when a surveillance circuit detects information indicative of an unauthorized use of the vehicle, which surveillance circuit, in this case, acts on the second generators such that this latter pressurizes the brakes of the vehicles.

It is easily understood that the hydraulic conduits connected to the brakes of the vehicle and that the hydraulic mechanisms of these brakes are put under pressure only at the moment wherein an unauthorized usage takes place.

According to another characteristic of the invention, the anti-theft device is provided with a timing means for limiting the duration of locking of the wheels of the vehicle by the second hydraulic generator.

This second timing means thus determines the duration of a locking cycle of the wheels which ceases at the end of a predetermined delay if meantime, the surveillance circuit does not receive other information indicative either of an unauthorized usage, or of a break-in; in which case, this cycle is reactivated.

Other advantages and characteristics of the invention will become apparent on reading of the description of a preferred embodiment given by way of non-limiting example referring to the accompanying drawings in which.

As represented, the anti-theft device for vehicles according to the invention acts on the braking circuit to lock the wheels. This braking circuit is constituted by a generator of hydraulic energy or master cylinder 1 connected to the hydraulic mechanisms of the brakes 2 of the vehicle by the intermediary of a principal conduit T and secondary conduits T'. The principal conduit T is connected, on the one hand, to the master cylinder and, on the other hand, to the secondary conduits.

These secondary conduits are connected to the hydraulic mechanisms of the four brakes 2 of the vehicle.

Figure 3:
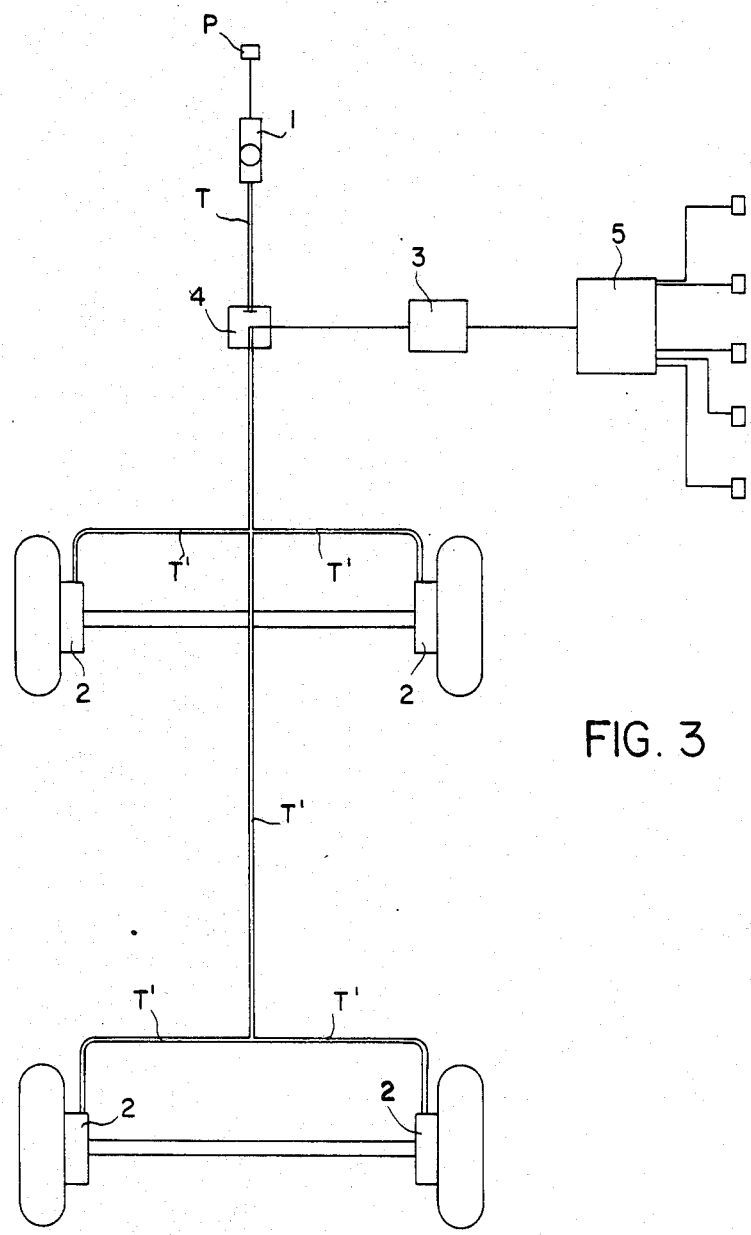

The anti-theft apparatus comprises a second generator 3 of hydraulic energy connected to the circuit below the first generator and a hydraulic circuit selection means 4 which switches the receiving mechanisms, that is to say the hydraulic mechanisms of the brakes 2, either only with the first generator 1 of hydraulic energy (FIG. 1), or only with the second generator of hydraulic energy (FIG. 3).

This latter switching is assured when a surveillance circuit 5 detects information indicative of an unauthorized use of the vehicle, which surveillance circuit, in this case, acts on the second generator 3 such that this latter pressurizes the brakes of the vehicle and assures the locking of the wheels.

Moreover, the locking device is equipped with a delaying means for limiting the duration of the locking of the wheels of the vehicle by the second hydraulic generator.

This second delaying means determines the duration of a locking cycle of the wheels which ceases at the end of a predetermined delay if meanwhile the surveillance circuit does not receive other information indicative, either of an unauthorized use, or of a break-in; in which case, this cycle is reactivated.

By way of purely indicative example, the duration of the locking cycle of the wheels is set at 15 minutes.

Figure 1:
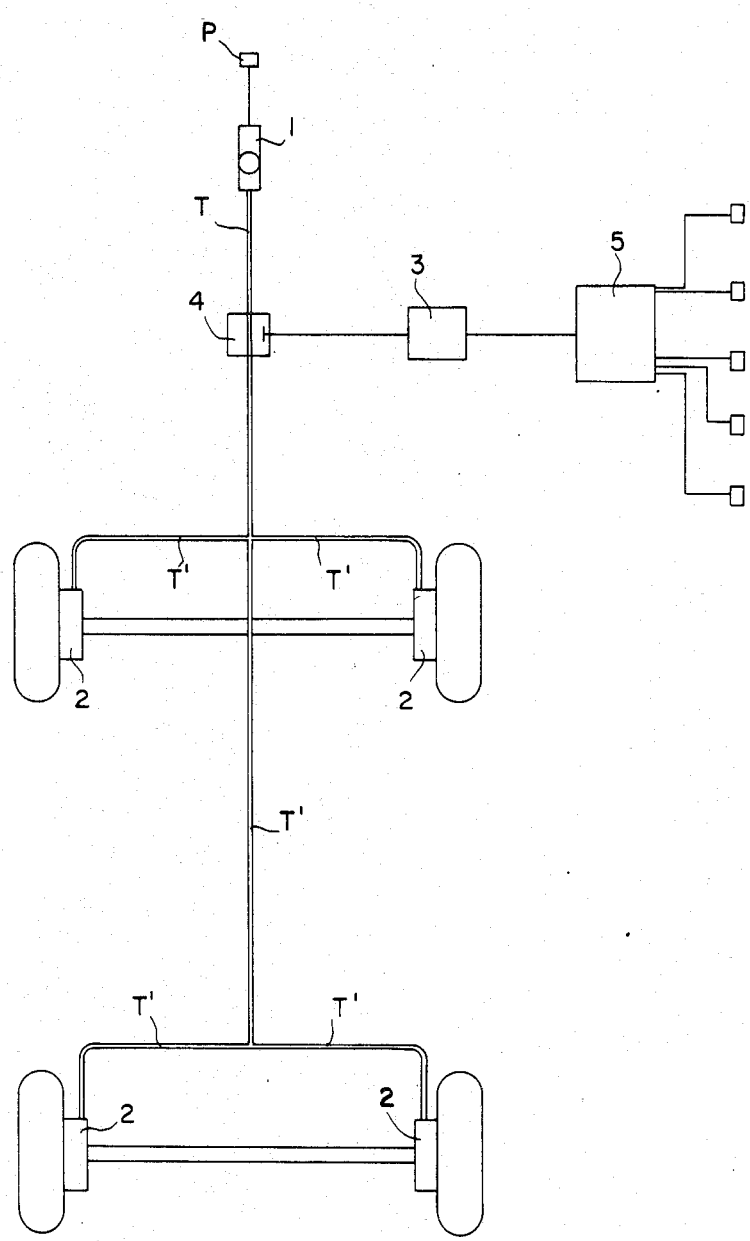
FIGS. 1 to 3 are schematic views explicative of the functioning of the device.
Figure 2:
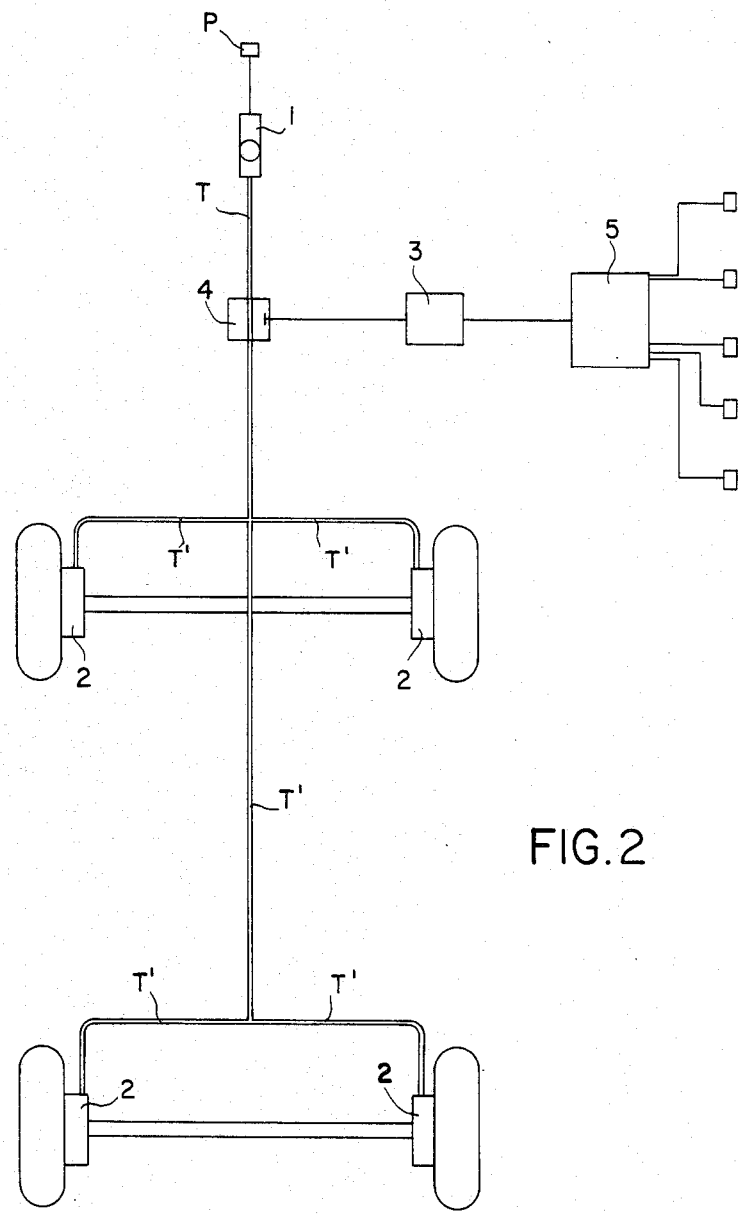

With reference to FIGS. 1, 2 and 3, the operation of the anti-theft device according to the invention will be explained. In these figures, the hydraulic conduits are shown in bold line while the electric linkages are shown in fine line.

FIG. 1 corresponds to the normal use of the braking circuit of the vehicle.

According to this figure, the selection means 4 prohibits the communication of the generator 3 with the braking circuit and assures the hydraulic communication of the master cylinder 1 with the conduits T' and the hydraulic mechanisms of the brakes 2.

Thus, when a pressure is exerted on the pedal "P", this pedal being mechanically connected to the piston of the master cylinder 1, the hydraulic conduits T, T' and the hydraulic mechanisms of the brakes 2 are placed under pressure, this effecting a braking of the vehicle. The relaxing of the pedal leads to the relaxing of the brakes 2.

FIG. 2 shows the hydraulic circuit and the anti-theft device according to the invention of a vehicle at extended rest.

According to this configuration, the circuit 5 of the anti-theft device assures the surveillance of the vehicle, and any break-in and any unauthorized usage do not occur.

According to this figure, the selection means 4 assures the communication of the master cylinder 1 with the hydraulic mechanisms of the brakes 2 and prohibits the communication of the generator 3 with the conduits T' and the hydraulic mechanisms 2.

On the contrary, after detection by the circuit 5 (FIG. 3) of information indicative of an unauthorized usage of the vehicle or indicative of a break-in of the latter; the selection means 4 switches the hydraulic mechanisms of the brakes 2 and the conduits T' with the second hydraulic energy generator 3 so as to lock the wheels.

One such configuration is shown in FIG. 3.

It is to be noted that according to this figure, the master cylinder 1 is isolated from the hydraulic circuit, by the selection means 4.

It will be readily understood that for a vehicle at rest, the brakes of the latter are locked only after detection of an unauthorized use or of a break-in, and this for a duration determined by the first delaying means.

This arrangement permits avoiding the placing under pressure of the hydraulic braking circuit during the entire duration of the rest.

[Translator's note: the last 11½ lines of page 6 of the French text are reproduced as the first 12 lines of page 7 of the French text and are therefore not translated.]

It is well to note that the anti-theft device assures the locking of the wheels with a lag time only if the surveillance circuit detects the opening of a passenger or driver door.

Thus, the usual driver of the vehicle arranges a reasonable delay to signal his presence to the surveillance device, this signalling of presence being attainable by delivering of a code to the surveillance circuit.

If at the end of this delay, the surveillance circuit has not received the code, the brakes are locked in the manner described above. It is to be pointed out that the brakes are locked immediately by the second generator if during this delay the driver places under tension the electric circuit of the vehicle before having introduced the code. Thus, any involuntary braking may not take place when the vehicle is in motion. The brakes are immediately locked if the surveillance device detects the opening of the hood of the engine, the baggage trunk or if it detects rotation of the wheels, the engine being stopped. This latter characteristic permits locking the brakes of the vehicle during a towing attempt or as well during a release of the parking brake for a vehicle parked on a hill of a street.

Figure 4:
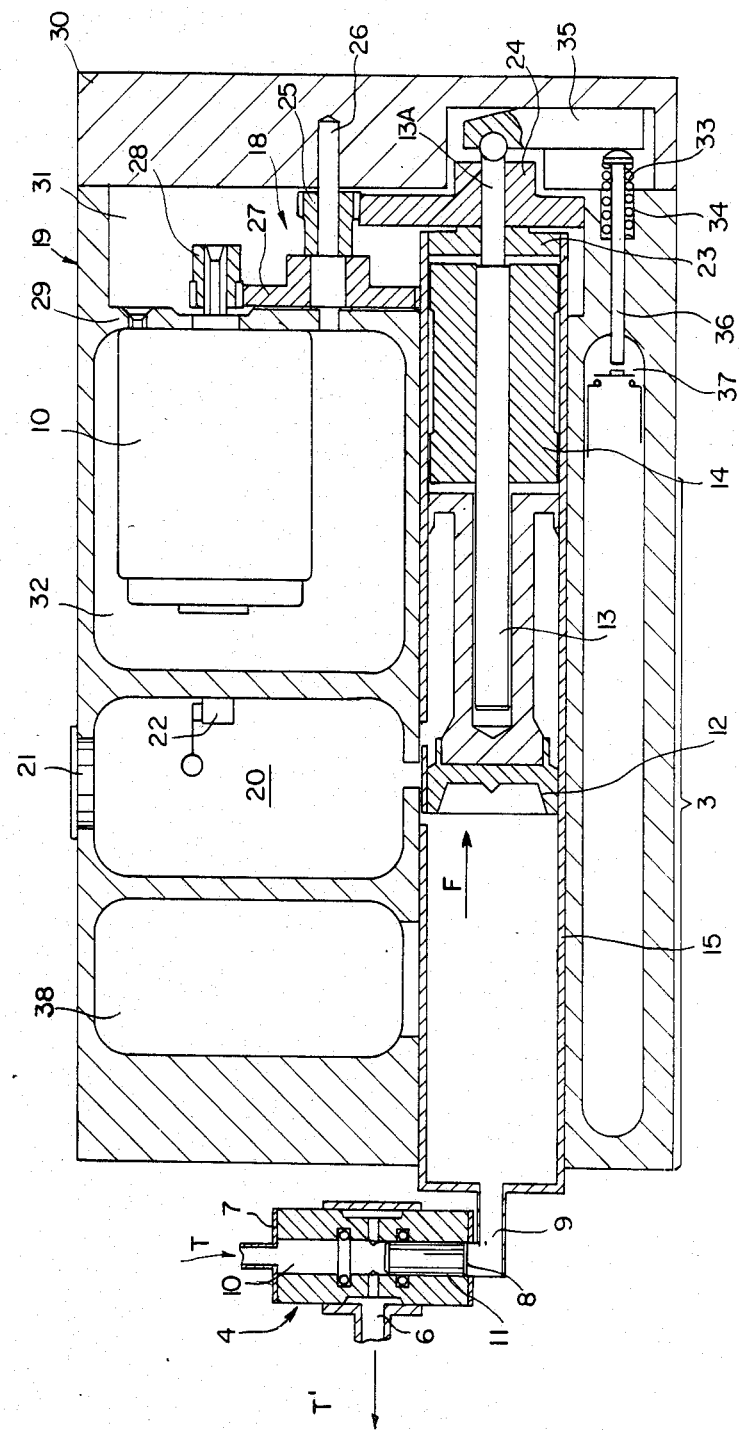
FIGS. 4 and 5 are views in longitudinal section of the device according to the invention.

According to a preferred embodiment shown in FIG. 4, the device according to the invention is constituted by a hydraulic selector 4 connected on the hydraulic braking circuit comprising an outlet port 6 connected by the intermediary of the conduits T' to the hydraulic mechanisms of the brakes 2, a first inlet port 7 connected by the conduit T to the master cylinder 1 and a second inlet port 8 connected by a hydraulic conduit 9 to the second generator 3 of hydraulic energy which is constituted by a master cylinder activated by a motor mechanism 10 supplied with energy by the surveillance circuit 5.

According to a preferrd embodiment, the hydraulic selector 4 is of the type comprising an internal bore 10 in which is displaced a piston 11, of the type comprising two opposed openings and in communication with the bore 10 these two openings constituting the two inlet ports 7 and 8 and of the type comprising a radial opening communicating with the bore 10, this latter opening constituting the outlet port 6.

Figure 5:
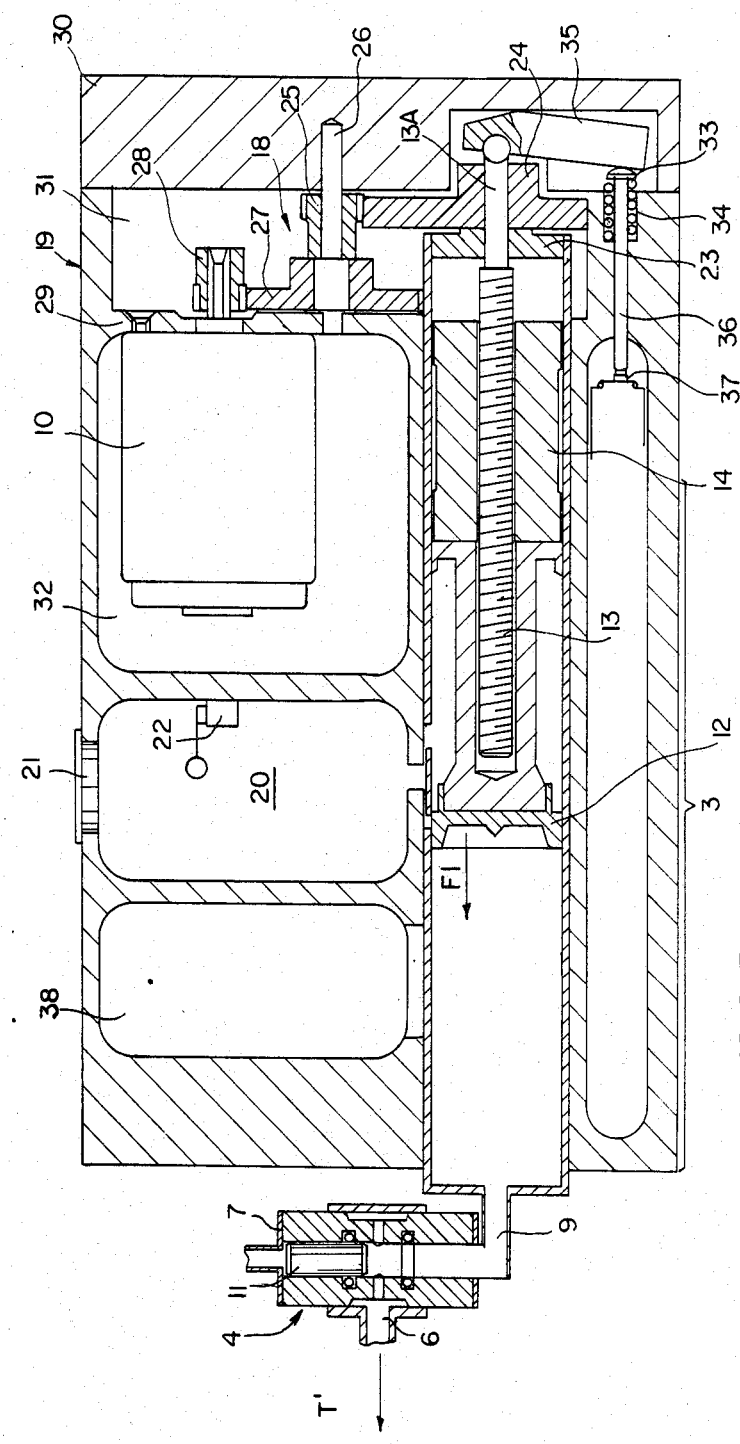
Figure 6:
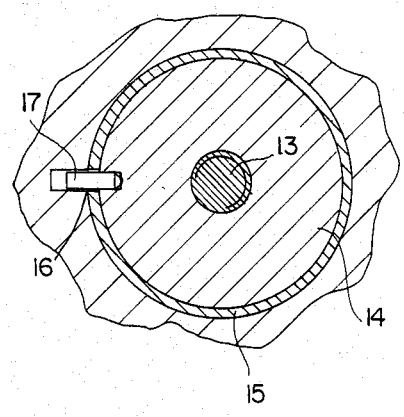
FIG. 6 is a view in cross section of the device according to the invention.

The circuit selector such as described assures the communication of the port 6 with the port 8 depending on whether the piston is in low position (FIG. 4) or in high position (FIG. 5).

The advantage of such a circuit selector resides in the fact that the displacement of the piston from the low position to the high position and back again is assured only by the effect of the pressure exerted, either on its lower extremity, or on its upper extremity by the expelled hydraulic fluid, either from the master cylinder 2, or from the master cylinder 1.

Thus, when the piston 12 of the master cylinder 2 is displaced in the sense of the arrow (FIG. 1) which corresponds to the placing under pressure of the hydraulic mechanisms of the brakes 2, the communication between the port 8 and the port 6 of the selector and consequently, the communication between the master cylinder 2 and the brakes 2 is effected in an automatic fashion.

After displacement of the piston of the master cylinder 2 in the direction of the arrow F corresponding to the freeing of the brakes 2 and during displacement of the piston of the master cylinder 1 in the direction which corresponds to the action of the brakes 2, the communication between the port 7 and the port 6 of the selector 4 and consequently, the communication between the master cylinder 1 and the brakes 2 is similarly effected in an automatic manner.

It is fully evident that the circuit selector could be of any known type. That is, the circuit selector could be constituted by an electro-valve 2 having two positions and three outlets, of which the displacement of the slide valve is controlled by electromagnet. The displacement in one direction or the other of the piston 12 of the master cylinder 2 is assured by the motor mechanism 10 by the intermediary of a mechanical transmission of the irreversible type.

One such type of transmission presents the advantage of permitting the cut-off of the energizing of the motor mechanism 10 when the conduits T' and the hydraulic mechanisms 2 are placed under pressure by the master cylinder 2 by virtue of the fact that it is opposed to the displacement of the piston 12 in the direction indicated by the arrow F. Thus the maintenance of the locking of the wheels does not require any expenditure of energy.

According to the preferred embodiment, the motor mechanism 10 is an electric motor of the type of which the rotor may be set in rotation following one direction or the other as a function of the electric tension applied to its lead. This electric tension is delivered by the surveillance circuit 5. Thus, when this circuit has detected information indicative of an unauthorized use or of a break-in, the rotor of the motor turns in one direction.

The rotor of the motor will be driven in the other sense at the end of the set delay by the delaying means such that additional information indicative of an unauthorized use or of a break-in is not delivered to the surveillance circuit, or as well during this set delay by the first delaying means if the surveillance system receives the code signalling the presence of the usual driver.

By the intermediary of the mechanical transmission, the rotation movement of the output shaft of the motor 10 is transformed in a movement of rectilinear translation communicated to the piston 12 of the master cylinder 2. According to a preferred embodiment, the mechanical transmission is constituted by a female screw 14 integral with the piston 12 locked in rotation and movable in translation, and by a male screw 13 driven in rotation by the output shaft of the motor 10. It is thus evident that the pitch of the thread of the female screw and of the male screw is sufficiently slight to meet the conditions of irreversibility.

Such a type of motor mechanism and such a type of transmission were preferred by virtue of the fact that they permit a progressive displacement of the piston 12 according to a sense of the arrow F1 and consequently a progressive increase of the pressure in the conduits T' and the hydraulic mechanisms of the brakes 2.

Always in the object of progressively introducing under pressure the conduits T' and the hydraulic mechanisms of the brakes 2, there is provided a driving gear 18 which transmits to the male screw 13 the movement of rotation of the output shaft of the motor 10 while reducing the speed of rotation of the said shaft.

As shown in FIGS. 3 and 4, the generator of hydraulic energy 3 is disposed in a self-protected housing 19. This housing comprises a longitudinal cylindrical cavity in which is mounted a casing 15 which receives the piston 12 of the master cylinder and the female screw 14 of the transmission.

For locking the female screw in rotation, the inner wall of the casing is provided with a sight hole 16 in which slides a pin 17 integral with the said female screw. The part before the casing 15 and the piston 12 defines a chamber 15A which receives an appropriate braking fluid. This chamber 15A is in relation with the port 8 of the selector 4 by the intermediary of the conduit 9.

Moreover, this chamber 15A is in relation with a reservoir 20 for braking fluid. This reservoir 20 is secured in the housing 19 above the longitudinal cavity receiving the casing 15.

This reservoir 20 is in relation with the chamber 15A and with a throat of the piston 12 employed behind its active part by the intermediary of an opening employed in the inner wall of the cavity and of an orifice and of a gorge employed in the inner wall of the casing 15. Such an arrangement is known in itself.

The reservoir 20 comprises a stopper 21 for the introduction of the braking fluid. Preferably, the reservoir 20 comprises a level recorder known in itself.

Behind the female screw 14, the casing 15 receives a smooth bearing 23 in which rotates the male screw 13. Beyond its bearing, the male screw 13 presents an axial extension 13A which cooperates with the drive gear 18. This drive gear is for example constituted by a first toothed wheel 24 mounted for rotation and translation on the extension 13A, by a toothed pinion 25 meshing with the toothed wheel 24, the said toothed pinion being mounted in rotation on an axle 26, by a second toothed wheel 27 mounted on the axle 26 and fixed axially to the pinion 25 and by a second toothed pinion geared with the wheel 27 and supported on the output shaft of the motor 10. According to the preferred embodiment, the axle 26 is mounted by one of its extremities in an opening made in a removable vertical wall 30 inserted in the housing 19.

The drive gear 18 is disposed in a cavity 31 limited by the wall 29 and the vertical wall 30.

According to the preferred embodiment, the motor 10 is mounted in a cavity 32 made in the housing 19 in advance of the wall 29. This motor is fixed to this wall. This wall is pierced by an opening assuring the communication between the cavity 32 and the cavity 31.

In this orifice is engaged the output shaft of the motor 10.

Advantageously, the anti-theft device is equipped with means for limiting the pressure in the conduits T' and the hydraulic mechanisms of the brakes 2 when these latter are pressurized by the hydraulic energy generator 3.

By way of purely indicative example, the hydraulic pressure is limited to 20 bars. Experience has demonstrated that this pressure is that sufficient for prohibiting the starting of the vehicle.

According to the preferred embodiment, the means for limiting the pressure to a predetermined value control the interruption of the energization of the motor mechanism 10 when the intensity of the axial force exerted by the male screw 13 on the female screw 14 attains a predetermined value, the value of this force being that which corresponds to the value of the above-mentioned pressure.

To this end, the male screw 13 is mounted so as to enable it to be displaced in translation with respect to the casing 15 and with respect to the bearing 23 and the means for limiting the pressure are constituted by a deformable elastic support 33 which exerts in the direction of the female screw 14 on the extension 13A of the male screw 13 an axial force the intensity of which depends on its deformation and on a recorder which detects a deformation threshold of the support and which controls in this case the stoppage of the motor mechanism.

According to the preferred embodiment, the elastic support 33 is constituted by a helical spring opposing the compression. This spring is mounted in a portion of a seat 34 of the housing 19 and exerts an axial force on the male screw 13 by the intermediary of a lever 35. This lever 35 is mounted in a groove made in the wall 30.

To detect the deformation of the support 33 from the occurrence of the compression of the spring, there is provided a pin 36, connected to the lever 35, which actuates an electric contact 37. The head of this pin is kept applied against the lever 35 by the compression support 33. The functioning of the means for limiting the pressure is as follows:

When the male screw is driven in rotation in a direction which corresponds to the advancement of the piston 12 according to the arrow F1, the axial force exerted on this latter is sufficiently great to be opposed to all translational movement of this latter. On the contrary, when the piston and female screw are no longer able to be displaced because of the incompressibility of the braking fluid, the male screw which is set in rotation is similarly imparted of a translational movement.

This translational motion is effected toward the lever 35. Thus, this rocking lever compressed the support 33 and urges the pin 36 toward the contact 37 (FIG. 5). It is well to note that the axial force applied on the male screw 13 by the lever 35 increases when the support 33 is compressed and that this force applied on the male screw is conveyed by the intermediary of the female screw 14 on the piston 12. In this fashion, the pressure of the hydraulic fluid increases so long as the male screw 13 is driven in rotation and in translation, that is to say as long as the contact 37 is not actuated by the pin 36 to interrupt the energization of the motor 10.

It will be understood that in adjusting the gap between the contact 37 and the pin 36, the value of the maximum pressure deliverable by the master cylinder 3 is adjusted. Preferably, the motor 10 remains energized several seconds after detection of the pin 36 by the recorder 37. In this manner, the desired pressure is in all cases attained. According to this arrangement, it is necessary that any mechanical contact is not established between the recorder 37 and the pin 36. For this reason, the recorder 37 is a leaf contact and the pin 36 is magnetized. At the time of the delay established by the first delaying means, the motor 10 is again energized and its output shaft is imparted of a rotational movement opposite to the preceding one. In this case, it is well to note that the male screw 13 first fully disengages the elastic support 33 before driving the female screw in translation in the direction corresponding to that of the arrow F.

The male screw 13 drives the female screw 14 when the toothed wheel 24 is introduced in contact with the bearing 23. To interrupt the energization of the motor when the piston 12 is in the position shown by FIG. 4, that is to say when the female screw 14 arrives at the end of its run, there is provided an electric contact actuated by the pin 17.

The surveillance circuit 4 is energized by two electrical batteries of which one having a relatively higher capacity is placed in the engine compartment of the vehicle and of which the other having a more reduced capacity is disposed in a compartment 38. In this manner, if the first battery is placed outside the circuit, the second battery protected by the housing 19 may continue to energize the surveillance circuit.

The surveillance circuit 5 of the anti-theft device is constituted by: an electronic analysis and control assembly which scrutinizes at least one auto-protection band comprising a first collector cluster 40 associated with the housing 19 of the device, at least one proximate surveillance loop comprising a second group of collectors 41 associated with the hood of the engine and with the baggage trunk, at least one delayed loop comprising a third group of collectors 42 associated with at least one door of the vehicle, at least one surveillance loop comprising a collector 43A of hydraulic pressure associated with the engine of the vehicle, at least one surveillance loop comprising a collector 43B of movement associated with one of the wheels of the vehicle and at least one surveillance loop comprising a collector 43C of electrical current associated with the electrical circuit of the vehicle, a code receiver 47 electrically associated with the assembly 39, a first stage of power control 46 electrically associated and to the turn signals of the vehicle and to the sonic alarm and a second power control stage electrically associated with the assembly 29 and with the motor 10.

Furthermore, the assembly 39 scrutinizes the state of the fluid level detector 22 in the reserve as well as the state of the recorder 37 and of the recorder associated with the pin 17.

It is well to note that the command stage 45 is associated with the first delaying means. According to a preferred embodiment, the second middle stage is similarly associated with a delaying means. Thus, as soon as a break-in or an unauthorized usage is detected, the sonic alarm as well as the turn signals are imparted with electrical energy conjointly with the locking of the wheels.

Preferably, the time during which the sonic alarm and the turn signals are energized is less than the time during which the locking of the wheel is assured.

According to a preferred embodiment, the stage 46 is electrically associated with an electric relay susceptible to assure the shutting off of the electrical circuit of energization of the ignition coil. This shutting off intervenes when this stage 46 is controlled by the assembly 39 to energize and the sonic alarm and the turn signals. The electronic assembly 39 treats the information that it receives from the different collectors and opens the alarms if necessary; this opening of the alarms is translated by the control of the power control stages 46 and 45.

The functioning of the surveillance device will now be explained in broad terms. When the driver leaves his vehicle, the circuit 4 is automatically armed. This arming is effected after the contact has been cut, and the vehicle and the engine have been stopped and becomes effective only when the said circuit detects the opening and the closing of a same door, that is to say when the driver leaves his vehicle.

It is well to note that during the automatic arming, an action on a collector of the group of collectors 40, 41, 43A, 43B, that is to say an action on the collectors other than those disposed on the timing loops immediately provokes the switching on of the alarms. It must be similarly noted that an action on the collectors 40 of the auto protection loop, whether or not the circuit is armed, similarly switches on the alarms.

The driver dispatches a code to signal his presence to the surveillance circuit. This code may be introduced from a keyboard or from any known means. The driver disposes a predetermined delay to signal his presence. This fixed delay, by a delaying means, runs from the moment where the driver has opened a door to enter into his vehicle. The surveillance circuit as described may be switched to a storage position during which it may not fulfill its surveillance function. It is to be noted that during this storage position, an action on the collectors 40 of the delaying loops provokes the opening of the alarms.

It goes without saying that the present invention may receive all arrangements and variations without departing from the present patent.

What is claimed is:

1. Anti-theft device for vehicles acting on the braking circuit to immobilize the wheels, the hydraulic braking circuit comprising a generator of hydraulic energy (1) in the form of a master cylinder connected by the intermediary of hydraulic conduits to receiving mechanisms of hydraulic energy in the form of brakes (2) characterized by a second generator of hydraulic energy (3) connected to the hydraulic braking circuit below the first generator (1) and by a hydraulic circuit selection means (4) which switches the receiving mechanisms (2), either only with the first hydraulic energy generator (1), or only with the second hydraulic energy generator, this latter switching being assured when a surveillance circuit detects information indicative of an unauthorized usage of the vehicle, which surveillance circuit in this case acts on the second generator such that this latter pressurizes the brakes of the vehicle, said second generator of hydraulic energy (3) comprising:
- an outlet port (6) connected to the hydraulic braking mechanisms (2) by the intermediary of the hydraulic conduits of the braking circuit,
- a first inlet port (7) connected by a conduit of the braking circuit to the master cylinder (1),
- and a second inlet port (8) connected by a hydraulic conduit (9) to the second generator (3) of hydraulic energy which is constituted by a master cylinder actuated by a motor mechanism (10) energized by the surveillance circuit.

2. Device according to claim 1 comprising a circuit selector (4) characterized in that the said selector is of the type comprising an internal bore (10) in which is displaced a piston (11), in that the said selector is of the type comprising two opposed openings and in communication with the bore, these two openings constituting the two inlet ports (7) and (8) and in that the said selector is of the type comprising a radial opening communicating with the bore, this latter opening constituting the outlet port (6).

3. Device according to claim 1 comprising a generator of hydraulic energy constituted by a master cylinder and an electrical motor, characterized by an irreversible mechanical transmission between the motor mechanism and the piston (12) of the master cylinder, this transmission transforming the rotational motion of the motor mechanism to a translational movement in communication with the piston of the master cylinder.

4. Anti-theft device according to claim 3 comprising an irreversible transmission between the motor (10) and the piston (12) of the master cylinder characterized in that the mechanical transmission is of the type having male screw (13) and female screw (14), this latter being integral with the piston, so as to permit a progressive increase of the pressure.

5. Anti-theft device according to claim 4, comprising a generator of hydraulic energy constituted by a master cylinder and comprising an irreversible transmission constituted by a female screw (14) integral with the piston (12) of the master cylinder and by a male screw (13), the said female screw and the said piston being mounted in a casing (15) which receives a bearing (23) for the male screw (13) characterized in that the said male screw is mounted so as to be displaceable in translation with respect to the casing (15) and the bearing (23).

6. Anti-theft device according to claim 5 comprising a means for limiting the pressure in the hydraulic mechanisms of the brakes (2) when these latter are pressurized by the master cylinder (3) and comprising a male screw (13) susceptible to being displaced in translation characterized in that the said means for limiting the pressure are constituted by a deformable elastic support (33) which exerts in the direction of the female screw (14), on an axial extension (13A) of the male screw (13), an axial force the intensity of which depends on its deformation and by a recorder which detects a threshold of deformation of the support and which controls in this case the stoppage of the motor mechanism (10).

7. Anti-theft device according to claim 1 characterized in that the master cylinder (3), the irreversible transmission and the motor mechanism are mounted in a casing (19) which is provided with a reservoir (20) for braking fluid which reservoir is in communication with the master cylinder (3).

8. Anti-theft device for vehicles acting on the braking circuit to immobilize the wheels, the braking circuit comprising a first generator of hydraluic energy in the form of a principal master cylinder, receiving mechanisms of hydraulic energy in the form of brakes, a principal hydraulic conduit connected to the master cylinder and secondary hydraulic conduits connected to the brakes, said device comprising in combination:
- (a) a second hydraulic energy generator associated with actuating motor means,
- (b) a hydraulic circuit selector connected to the braking circuit comprising an outlet orifice connected to the hydraulic energy receivers by secondary conduits, a first inlet orifice connected by the principal conduits to the principal master cylinder and a second inlet orifice connected by a hydraulic conduit to the second hydraulic energy generator, said circuit selector being of the type having an internal bore in which open two opposed orifices constituting the inlet orifices, into which empty a radial orifice constituting the outlet orifice and in which is mounted slidably a piston which is urged toward one or the other inlet orifice to close it, by liquid pressurized by one or the other of the hydraulic energy generators, and
- (c) a surveillance circuit which energizes the motor means of the second generator whereby the latter pressurizes the brake circuit, when it detects an unauthorized usage of the vehicle or attempted entry of the vehicle.

9. Anti-theft device for vehicles according to claim 8, in which the surveillance circuit comprises timing means to limit the duration of braking of the wheels of the vehicle by the second generator by feeding energy for a predetermined delay period by this timing means, to the motor means of the second generator in the direction corresponding to depressurization of the hydraulic circuit.

10. Anti-theft device for vehicles according to claim 8, in which the second hydraulic energy generator is constituted by a master cylinder actuated by motor means.

11. Anti-theft device for vehicles according to claim 8, comprising a second hydraulic energy generator provided with actuating motor means characterized in that the latter means is constituted by a direct current electric motor whose direction of rotation is reversible by reversal of the polarity of a feed voltage.

12. Anti-theft device for vehicles according to claim 8, comprising a hydraulic energy generator constituted by a master cylinder and an electric motor, and including an irreversible mechanical transmission between the motor means and the piston (12) of the master cylinder, this transmission transforming the rotative movement of the motor means to translatory movement communicated to the piston of the master cylinder.

13. Anti-theft apparatus for vehicles according to claim 12, and an irreversible transmission between the motor (10) and the piston (12) of the master cylinder, in which the mechanical transmission is of the screw (13) and nut (14) type, this latter being secured to the piston, thereby to permit progressive increase of the pressure.

14. Anti-theft apparatus for vehicles according to claim 8, comprising a hydraulic energy generator constituted by a master cylinder and comprising an irreversible transmission constituted by a nut (14) secured to the piston (12) of the master cylinder and by a screw (13), said nut and said piston being mounted in a sleeve (15) which receives a bearing (23) for the screw (13), and in which said screw is mounted so as to be displaceable in translation relative to the sleeve (15) and to the bearing (23).

15. Anti-theft apparatus for vehicles according to claim 8, comprising means to limit the pressure in the hydraulic mechanisms of the brakes (2) when the latter are pressurized by the master cylinder (3) and comprising a screw (13) adapted to be displaced in translation, and in which said means to limit the pressure are constituted by an elastic deformable abutment (33) which exerts in the direction of the nut (14), on an axial extension (13A) of the screw (13), an axial force whose magnitude depends on its deformation and by a detector which detects the level of deformation of the abutment and which controls in this case the stopping of the motor means (10).

16. Anti-theft apparatus for vehicles according to claim 8, characterized in that the master cylinder (3), the irreversible transmission and the motor means are mounted in a housing (19) which is provided with a reservoir (20) of braking liquid, said reservoir being in communication with the master cylinder (3).

* * * * *